(12) United States Patent
Ohba et al.

(10) Patent No.: US 7,554,497 B2
(45) Date of Patent: Jun. 30, 2009

(54) ANTENNA DEVICE AND WIRELESS DEVICE

(75) Inventors: Isao Ohba, Hachioji (JP); Hiromichi Suzuki, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 106 days.

(21) Appl. No.: 11/900,219

(22) Filed: Sep. 11, 2007

(65) Prior Publication Data
US 2008/0211721 A1  Sep. 4, 2008

(30) Foreign Application Priority Data
Sep. 13, 2006  (JP) .............................. P2006-248595

(51) Int. Cl.
*H01Q 1/24* (2006.01)
*H01Q 1/38* (2006.01)
(52) U.S. Cl. .................. 343/702; 343/700 MS
(58) Field of Classification Search ................. 343/702, 343/700 MS, 846, 872, 876
See application file for complete search history.

(56) References Cited

U.S. PATENT DOCUMENTS

| 7,012,571 | B1 * | 3/2006 | Ozkar et al. ................ 343/702 |
| 7,209,086 | B2 * | 4/2007 | Chung ........................ 343/702 |
| 7,245,950 | B2 * | 7/2007 | Iwai et al. ................. 455/575.7 |
| 2009/0033563 | A1 * | 2/2009 | Kanasaki et al. ............ 343/702 |

FOREIGN PATENT DOCUMENTS

| JP | 2004-096209 A | 3/2004 |
| JP | 2005-217623 A | 8/2005 |
| JP | 2005-277865 A | 10/2005 |

* cited by examiner

*Primary Examiner*—Shih-Chao Chen
(74) *Attorney, Agent, or Firm*—Frishauf, Holtz, Goodman & Chick, P.C.

(57) ABSTRACT

According to an aspect of the invention, there is provided an antenna device housed within a wireless device, including: a first case and a second case at least partly overlapping with each other, the first and second cases electrically connected with each other and slidable to open and close the antenna device; a first board housed within the first case; a second board housed within the second case; a first unbalanced antenna element connected to a first feeding point located in a vicinity of a first edge departing from the second case among edges of the first board when the first case and the second case are slid in a direction to open the wireless device; and a second unbalanced antenna element being connected to a second feeding point located in a vicinity of a second edge substantially perpendicular to the first edge among edges of the second board.

6 Claims, 14 Drawing Sheets

485MHz (λ/4 = 15cm)

570MHz (λ/4 = 13cm)

650MHz (λ/4 = 11cm)

725MHz (λ/4 = 10cm)

—— : HORIZONTAL
---- : VERTICAL

ANTENNA DEVICE AND WIRELESS DEVICE

CROSS-REFERENCE TO RELATED APPLICATIONS

This application is based on and claims the benefit of priority from the prior Japanese Patent Application No. 2006-248595, filed on Sep. 13, 2006; the entire contents of which are incorporated herein by reference.

BACKGROUND

1. Technical Field

The present invention relates to an antenna device and a wireless device, and more particularly, to a portable wireless device and an antenna device used for the portable wireless device.

2. Description of Related Art

A wireless device, such as a cellular phone, has come into wide use, and the application range thereof has been expanded. For example, a wireless device capable of receiving digital terrestrial television (TV) broadcasting has been developed. A type of an antenna device used for the wireless device has been transferred to a built-in case type having good design and usefulness, and an antenna device for receiving the terrestrial digital TV broadcasting is no exception.

Since the terrestrial digital TV broadcasting for a cellular phone uses a frequency in an UHF band lower than a communication frequency, a wavelength thereof is larger than a size of the general cellular phone. Accordingly, in the antenna device for receiving the terrestrial digital TV broadcasting, only the antenna element of the built-in case type is insufficient as a radiation element and the Printed Circuit Board (PCB) is required to be used as the radiation element. However, in such an antenna device, an antenna current tends to be distributed in one direction on the board. For this reason, a null point of a radiation pattern in the direction of the current easily occurs.

In order to solve the above-mentioned problem, it is disclosed by, for example JP-A-2004-96209, that there is a beam diversity technique using two or more antennas in which directions of a null point of a radiation pattern are different from each other. It is also disclosed by, for examples JP-A-2005-277865 or JP-A-2005-217623, that there is a technique to vary a shape of a radiation pattern using an auxiliary antenna element or an impedance matching element.

JP-A-2004-96209 discloses that chip antennas are provided at two adjacent corners on a board, respectively, resonance currents in diagonal directions excited on the PCB from the chip antennas are made perpendicular to each other, and radiation patterns generated by the resonance currents are complemented with each other to thus form an omnidirectional radiation pattern. (e.g., see pages 2, 5, and 6, and FIG. 1.)

In JP-A-2005-277865, there is disclosed a technique in which a half-wavelength compensation antenna is disposed opposite to a chip antenna, one end of the compensation antenna is switched to be opened or grounded, and thus a shape of a radiation pattern formed by the chip antenna and the compensation antenna is made variable (e.g., see pages 2 and 4 to 6, and FIG. 2).

In JP-A-2005-217623, there is disclosed a technique in which a front end of an antenna element loaded with a variable impedance element therein is grounded on a board, the impedance thereof is varied, and thus a shape of a radiation pattern formed by the antenna element is made variable (e.g., see pages 2, 5, and 6, and FIG. 1).

According to the technique disclosed in JP-A-2004-96209, it is required to secure a diagonal length of the PCB, on which the chip antenna is provided at the corner, by one-fourth wavelength. Accordingly, it has been restricted that the technique is applied to transmission or reception in a frequency band lower than a frequency band for communication in a small-sized wireless device such as a cellular phone.

JP-A-2005-277865 can be applied to only 2.4 GHz band or more frequency band. Accordingly, it has been restricted that the technique is applied to transmission or reception in a frequency band lower than a frequency band for communication in a small-sized wireless device such as a cellular phone. In the technique disclosed in JP-A-2005-217623, a variable reactive element and a control circuit thereof are required. Accordingly, a circuit configuration or a control may be complicated.

SUMMARY

According to an aspect of the invention, there is provided an antenna device housed within a wireless device, including: a first case and a second case at least partly overlapping with each other, the first and second cases electrically connected with each other and slidable to open and close the antenna device; a first board housed within the first case; a second board housed within the second case; a first unbalanced antenna element connected to a first feeding point located in a vicinity of a first edge departing from the second case among edges of the first board when the first case and the second case are slid in a direction to open the wireless device; and a second unbalanced antenna element being connected to a second feeding point located in a vicinity of a second edge substantially perpendicular to the first edge among edges of the second board.

According to another aspect of the invention, there is provided an antenna device housed within a wireless device, including: a first case and a second case being connected and at least partly overlapping with each other; a first board that housed within the first case; a first unbalanced antenna element being connected to a first feeding point located in a vicinity of a first edge far from the second case among edges of the first board; a second board having substantially the same size as that of the first board, the second board housed within the second case and electrically connected to the first board, the second board being disposed so that a substantially half area thereof overlaps with a substantially half area of the first board; and a second unbalanced antenna element being located in a vicinity of a second edge substantially perpendicular to the first edge among edges of the second board and connected to a second feeding point located substantially in a middle between an edge of the second board far from the first case and the first edge.

According to another aspect of the invention, there is provided a wireless device including: a first case; a second case at least partly overlapping with the first case so as to open and close the wireless device by sliding the first case and the second case; a first board that housed within the first case; a first unbalanced antenna element being connected to a first feeding point located in a vicinity of a first edge departing from the second case among edges of the first board when the first case and the second case are slid in a direction to open the wireless device; a second board housed within the second case and electrically connected to the first board; a second unbalanced antenna element connected to a second feeding point located in a vicinity of a second edge substantially perpendicular to the first edge among edges of the second board; and a diversity circuit being connected to the first unbalanced antenna element and the unbalanced second antenna element.

DESCRIPTION OF THE EMBODIMENTS

Hereinafter, embodiments of the invention will be described with reference to the drawings.

First Embodiment

Figure 1A:
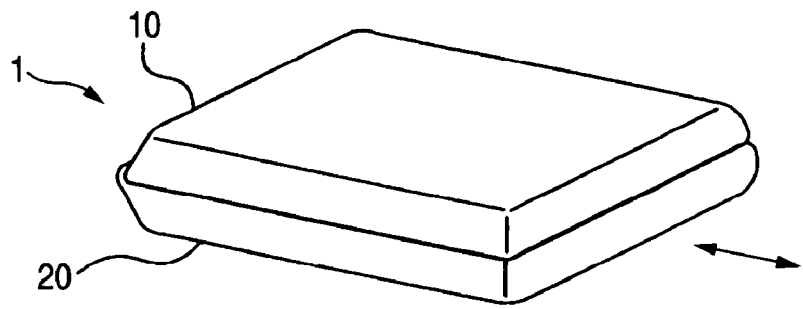
FIG. 1A is an exemplary diagram illustrating a wireless device in a closed state according to a first embodiment of the invention.
Figure 1B:
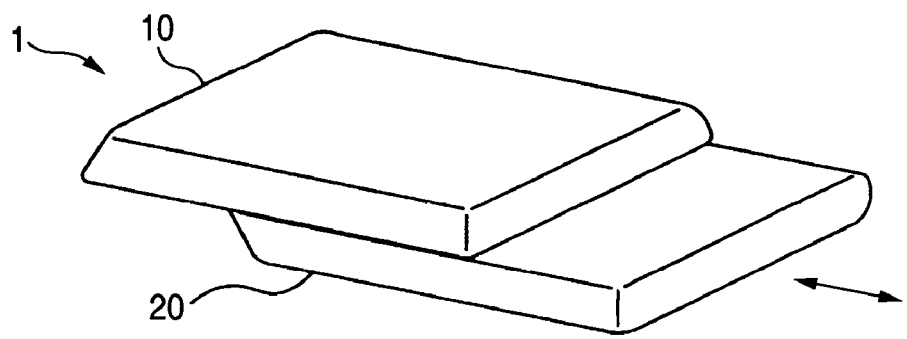
FIG. 1B is an exemplary diagram in a half-opened state according to the first embodiment.
Figure 1C:
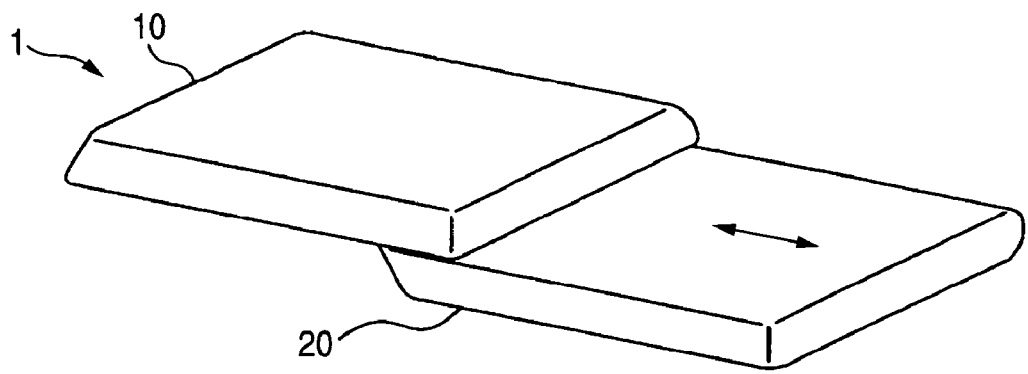
FIG. 1C is an exemplary diagram in an opened state according to the first embodiment.

Hereinafter, a first embodiment of the invention will be described with reference to FIGS. 1 to 9C. A wireless device 1 according to the first embodiment can be opened and closed by sliding a first case 10 and a second case 20 overlapping with each other. FIG. 1A shows a state (referred to as a closed state) where the first case 10 and the second case 20 are closed relative to each other. FIG. 1B shows a state (referred to as a half-opened state) where the first case 10 and the second case 20 are half opened relative to each other. FIG. 1C shows a state (referred to as an opened state) where the first case 10 and the second case 20 are opened relative to each other. Bidirectional arrows in FIGS. 1A to 1C denotes directions in which the first case 10 and the second case 20 are slid relative to each other.

Although a display, an input key, a transmitter, a receiver, or a camera can be mounted on the sides of the first case 10 or the second case 20, they are not shown in FIGS. 1A to 1C.

Figure 2:
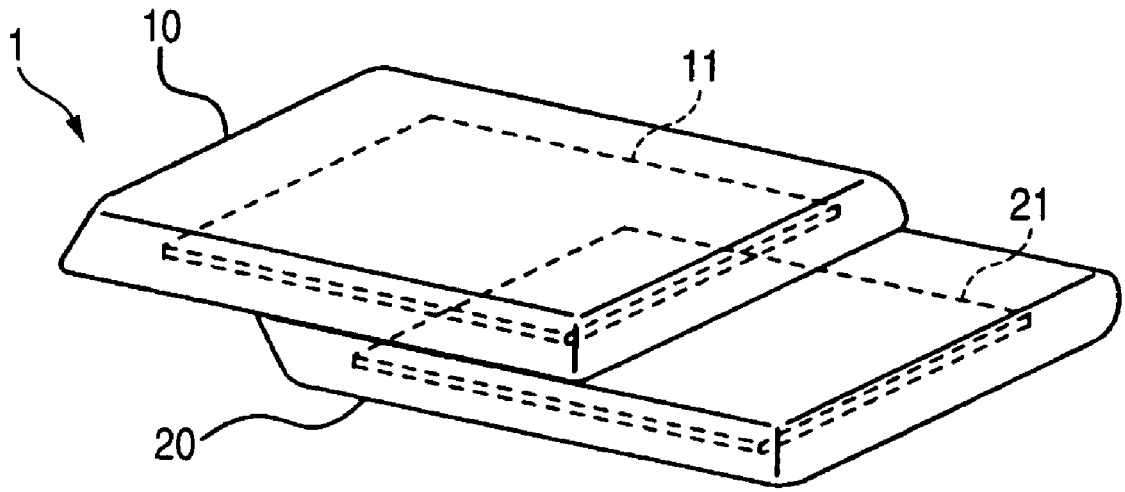
FIG. 2 is an exemplary diagram illustrating boards of a wireless device or an antenna device according to the first embodiment.

FIG. 2 is a diagram illustrating boards housed within the first case 10 and the second case 20, respectively. A first board 11 represented by broken lines is housed within the first case 10. A second board 21 represented by broken lines is housed within the second case 20. A positional relation between the first case 10 and the second case 20 shown in FIG. 2 is the same as the half-opened state shown in FIG. 1B.

Figure 3:
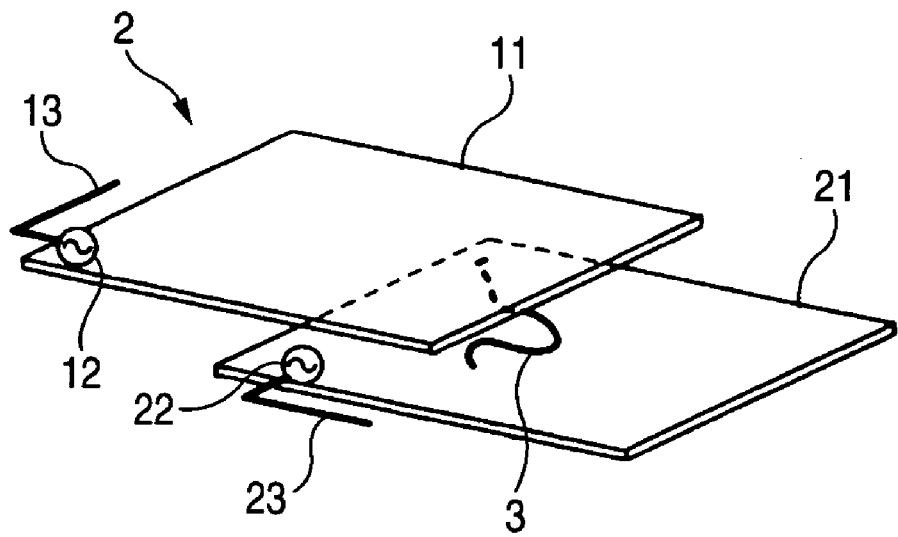
FIG. 3 is an exemplary diagram illustrating the antenna device according to the first embodiment.

FIG. 3 is a diagram illustrating an antenna device 2 housed within the wireless device 1. The antenna device 2 includes a first board 11, a first antenna element 13 connected to a first feeding point provided on the first board 11, a second board 21, and a second antenna element 23 connected to a second feeding point 22 provided on the second board 21. A positional relation between the first board 11 and the second board 21 shown in FIG. 3 is the same as the half-opened state shown in FIG. 2. The first antenna element 13 or the second antenna element 23 is housed within the first case 10 or the second case 20, respectively (in FIG. 2, in order to avoid complexity, the first feeding point 12, the first antenna element 13, the second feeding point 22, and the second antenna element 23 are not shown).

The first feeding point 12 is provided in the vicinity of an edge (for convenience of description, referred to as an upper edge of the first board 11) departing from the second case 20 among edges of the first board 11 when the first case 10 and the second case 20 are slid in an opening direction. The second feeding point 22 is provided in the vicinity of an edge (for convenience of description, referred to as a left edge of the second board 21) substantially perpendicular to the upper edge of the first board 11 and substantially parallel to the sliding direction of the first case 10 and the second case 20 among edges of the second board 21.

The first antenna element 13 and the second antenna element 23 are a unbalanced antenna element. The first board 11 has a ground pattern (not shown). When the first antenna element 13 is excited, current flows in the ground pattern. The second board 21 has a ground pattern (not shown). When the second antenna element 23 is excited, current flows the ground pattern. The ground pattern of the first board 11 and the ground pattern of the second board 21 are electrically connected to each other by a connection line 3. Since the ground pattern of the first board 11 and the ground pattern of the second board 21 are spatially close to each other and are electrically connected to each other, the combination of the ground patterns of the first board 11 and the second board 23 serves as one ground plate relative to any of the first antenna element 13 and the second antenna element 23.

Figure 4:
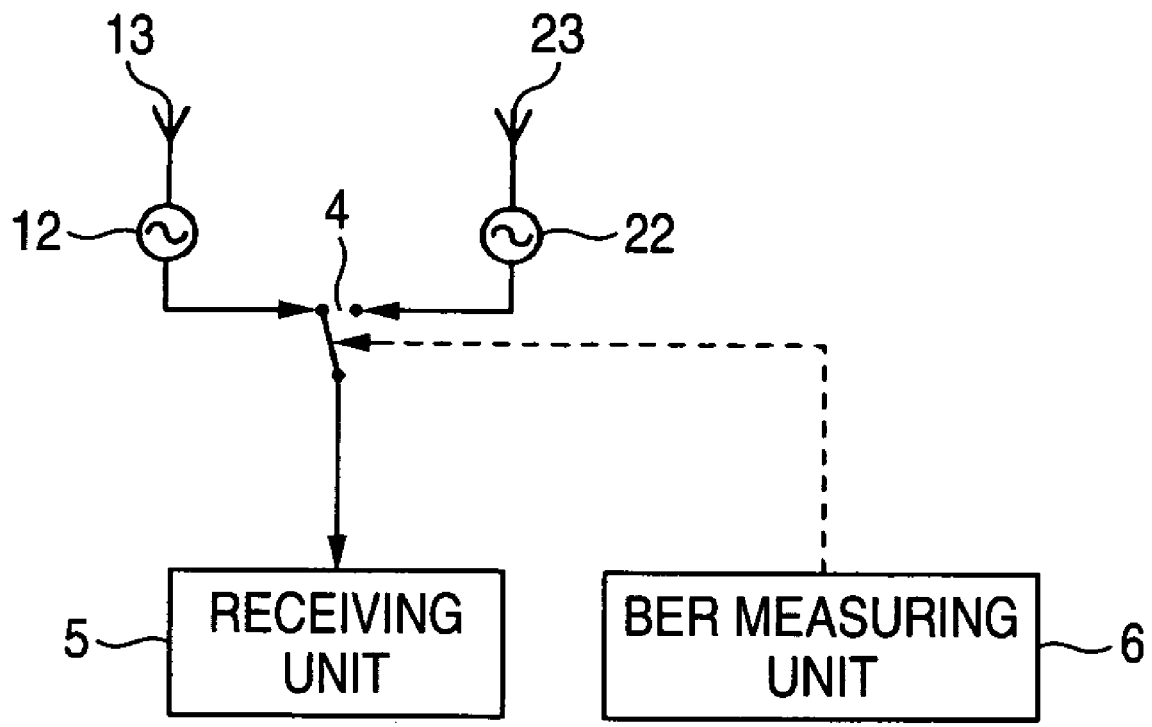
FIG. 4 is an example of connection of a diversity circuit according to the first embodiment.

FIG. 4 is a diagram illustrating an example of a connection of a diversity circuit including the antenna device 2. A switch 4, a receiving unit 5, and a bit error rate (BER) measuring unit 6 shown in FIG. 4 may be provided on the first board 11 or the second board 21. The receiving unit 5 is switchably connected to any one of the first feeding point 12 or the second feeding point 22 by the switch 4.

In FIG. 4, a radio wave arriving at the first antenna element 13 is received through the first feeding point by the receiving unit 5. The BER measuring unit 6 measures a BER of the output signal of the receiving unit 5, and outputs a control signal for switching the switch 4 when the measured BER is lower than a regular critical value (represented by a broken arrow in FIG. 4). After switching the switch 4, the second antenna element 23 is connected to the receiving unit 5 through the second feeding point 22 and the switch 4. Then the BER measuring unit 6 performs the same control operation.

The diversity circuit is not limited to what is shown in FIG. 4. For example, the switch 4 may be switched by not the automatic operation but a manual operation. For example, the waves arriving at the first antenna element 13 and the second antenna element 23 may not be selected by switching the switch 4 but may be mixed with each other. For example, the diversity circuit may be connected to a transmitting unit (not shown) as well as the receiving unit 5 to perform the diversity of a transmitting wave.

Figure 5:
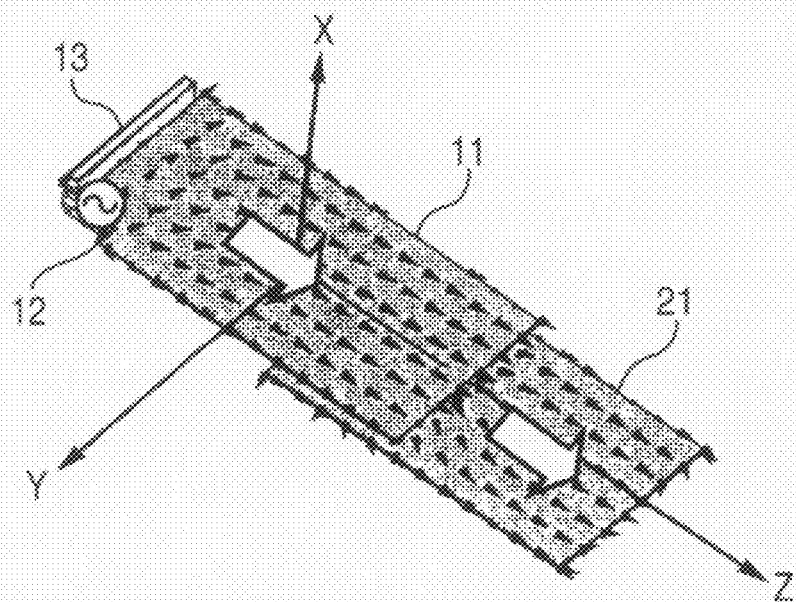
FIG. 5 is an exemplary diagram illustrating a current distribution on a board by simulation in the case of exciting a first antenna element according to the first embodiment.

The radiation pattern formed in the case of exciting the first antenna element 13 will be described with reference to FIGS. 5 and 6. FIG. 5 is a diagram illustrating an example of a current distribution on the ground patterns of the first board 11 and the second board 21 by a simulation when the first antenna element 13 is excited in the half-opened state of the first case 10 and the second case 20. It is assumed that the whole surface of at least one of the first board 11 and the second board 21 is covered with the ground pattern. Configurations represented by reference numerals shown in FIG. 5 are the same as the configurations represented by the same reference numerals shown in FIG. 3.

In FIG. 5, an axis perpendicular to a plane of the first board 11 or the second board 21 denotes an X-axis. An axis parallel to the edge provided in the vicinity of the first feeding point 12 in the plane of the first board 11 denotes a Y-axis. An axis parallel to the sliding direction of the first case 10 and the second case 20 relative to each other in the plane of the first board 11 denotes a Z-axis.

A direction indicated by arrow of each axis denotes a positive direction and the opposite direction thereof denotes a negative direction. The upper edge of the first board 11 is an edge on the negative direction side of the Z-axis. Similarly about the other edges of the first board 11, an edge on the positive direction side of the Z-axis, an edge on the negative direction side of the Y-axis, and an edge on the negative direction side of the Y-axis denotes a lower edge, a left edge, and a right edge, respectively. The left edge of the second board 21 is an edge on the positive direction side of the Y-axis. Similarly about the other edges of the second board 21, an edge on the negative direction side of the Z-axis, an edge on the positive direction side of the Z-axis, and an edge on the negative direction side of the Y-axis denotes a upper edge, a lower edge, and a right edge, respectively.

In FIG. 5, the combination of the ground patterns of the first board 11 and the second board 21 serves as one ground plate relative to the first antenna element 13 as described above. Black arrows distributed on the plane of the first board 11 or the second board 21 denotes directions of current at the positions thereof. The current distributed on the plane of the first board 11 or the second board 21 is distributed generally from the upper edge to the lower edge as indicated by a block arrow with outline, that is, the current is distributed in the positive direction of the Z-axis.

Figure 6:
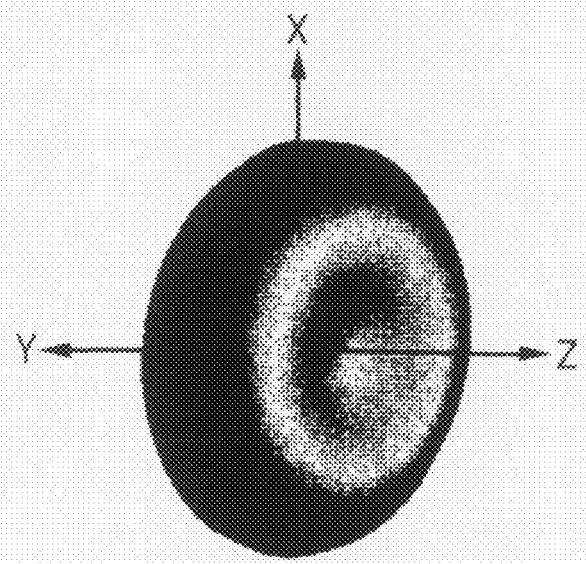
FIG. 6 is an exemplary diagram illustrating a three-dimensional radiation pattern formed by the current distribution shown in FIG. 5.

FIG. 6 is a diagram illustrating a three-dimensional radiation pattern formed by the current distribution shown in FIG. 5. In FIG. 6, an X-axis, a Y-axis, and a Z-axis are the same as the X-axis, the Y-axis, and the Z-axis shown in FIG. 5, respectively. The current distribution shown in FIG. 5 is similar to a current distribution of a dipole antenna forming a donut-shaped radiation pattern having a null point in a current direction. Accordingly, a donut-shaped radiation pattern having a null point in the Z-axis direction which is the current direction is formed as shown in FIG. 6. In diagrams illustrating three-dimensional radiation patterns below FIG. 6, antenna gains represented by gradation are different from one another. For this reason, largeness and smallness of the antenna gains cannot be compared with each other by using the diagrams.

Figure 7:
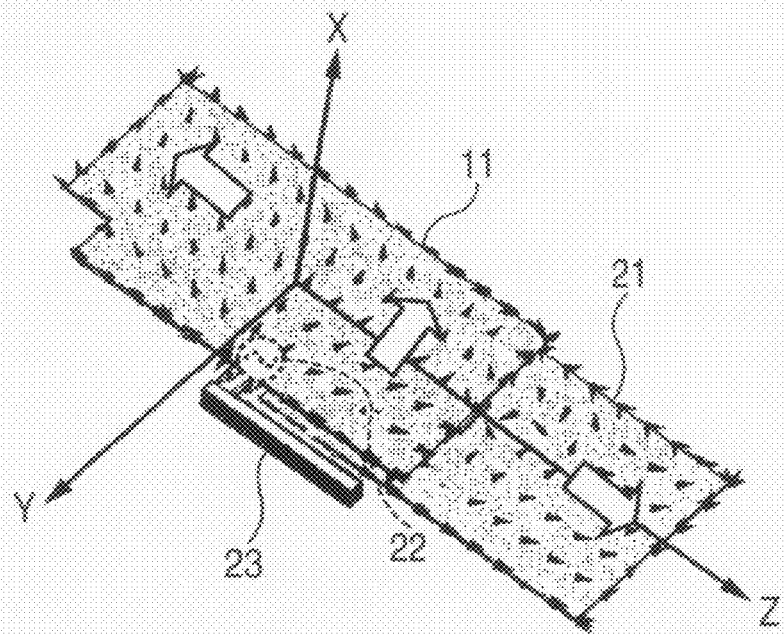
FIG. 7 is an exemplary diagram illustrating a current distribution on a board by simulation in the case of exciting a second antenna element according to the first embodiment.

The radiation pattern formed in the case of exciting the second antenna element 23 will be described with reference to FIGS. 7 and 8. FIG. 7 is a diagram illustrating an example of the current distribution on the ground patterns of the first board 11 and the second board 21 by simulation in the case of exciting the second antenna element 23, in the half-opened state of the first case 10 and the second case 20. It is assumed that the whole surface of at least one of the first board 11 and the second board 21 is covered with the ground pattern.

Figure 8:
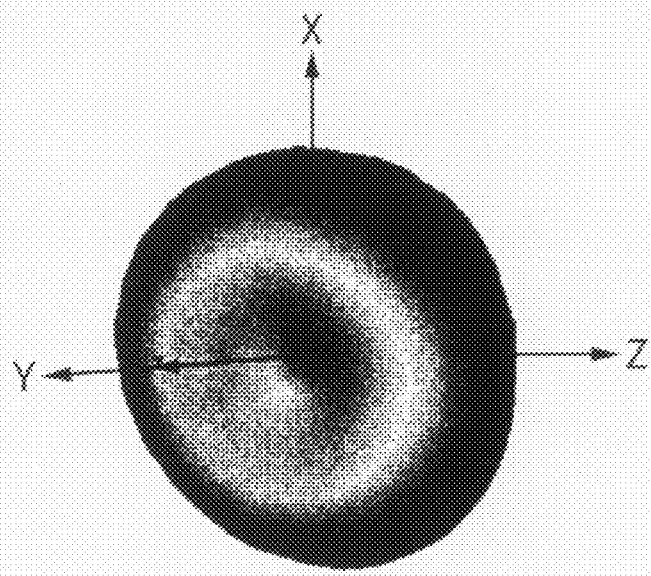
FIG. 8 is an exemplary diagram illustrating a three-dimensional radiation pattern formed by the current distribution shown in FIG. 7.

Configurations represented by reference numerals shown in FIG. 8 are the same as the configurations represented by the same reference numerals shown in FIG. 3. Since the second feeding point 22 provided on the second board 21 is located in the shade of the first board 11 in the oblique view from the upper side of the first board 11 as shown in FIG. 7, the second feeding point 22 is represented by a dotted line. Axes shown in FIG. 7 are the same as the axes shown in FIG. 5.

In FIG. 7, the combination of the ground patterns of the first board 11 and the second board 12 serves as one ground plate relative to the second antenna element 23 as described above. Black arrows distributed on the plane of the first board 11 or the second board 21 denotes directions of current at positions thereof.

The current on the ground pattern of the first board 11 is distributed from the vicinity of the second feeding point 22 in the left edge to the right edge, that is, in the negative direction of the Y-axis (represented by a block arrow with an outline in the negative direction of the Y-axis). Then, the direction of the current is changed and the current is distributed toward the upper edge, that is, in the negative direction of the Z-axis (represented by a block arrow with an outlines in the negative direction of the Z-axis).

Similarly to the first board 11, the current on the ground pattern of the second ground board 21 is distributed from the vicinity of the second feeding point 22 to the right edge, that is, in the negative direction of the Y-axis (represented by the same block arrow with an outline as the first board 11 in the negative direction of the Y-axis). The direction of the current is changed and the current is distributed toward the lower edge, that is, in the positive direction of the Z-axis (represented by a block arrow with an outline in the positive direction of the Z-axis).

FIG. 8 is a diagram illustrating a three-dimensional radiation pattern formed by the current distribution shown in FIG. 7. In FIG. 8, an X-axis, a Y-axis, and a Z-axis are the same as the X-axis, the Y-axis, and the Z-axis shown in FIG. 7, respectively. In the current distribution shown in FIG. 7, the current distributed toward the upper edge (in the negative direction of the Z-axis) of the first board 11 and the current distributed toward the lower edge (in the positive direction of the Z-axis) of the second board 21 are offset in the reversed phase relative to each other and thus deteriorate the contribution to form the radiation pattern. Accordingly, as shown in FIG. 8, a donut-shaped radiation pattern having a null point in the Y-axis direction is formed by the currents in the same phase mainly distributed toward the right edges (in the negative direction of the Y-axis) of the first board 11 and the second board 21.

Since the direction of the null point of the radiation pattern in the case of exciting the first antenna element 13 shown in FIG. 6 and the direction of the null point of the radiation pattern in the case of exciting the second antenna element 23 shown in FIG. 8 are substantially perpendicular to each other, both patterns are in a complementary relation. For example, when the diversity circuit including the first antenna element 13 and the second antenna element 23 is configured as shown in FIG. 4, a beam diversity can be realized by a simple operation allowing the first case 10 and the second case 20 to be in the substantially half-opened state.

Figure 9A:
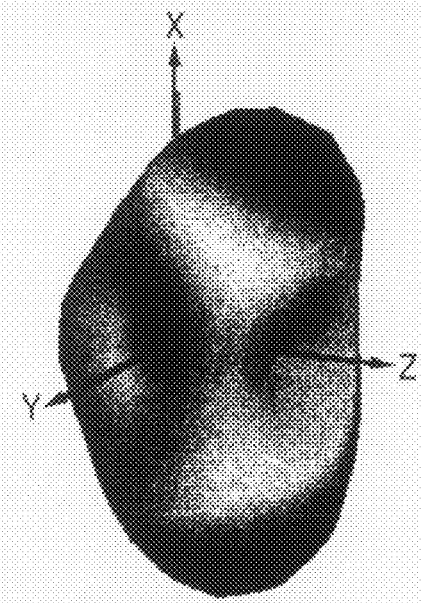
FIG. 9A is an exemplary diagram illustrating three-dimensional radiation patterns in the case of exciting the second antenna element in an opened state according to the first embodiment.
Figure 9B:
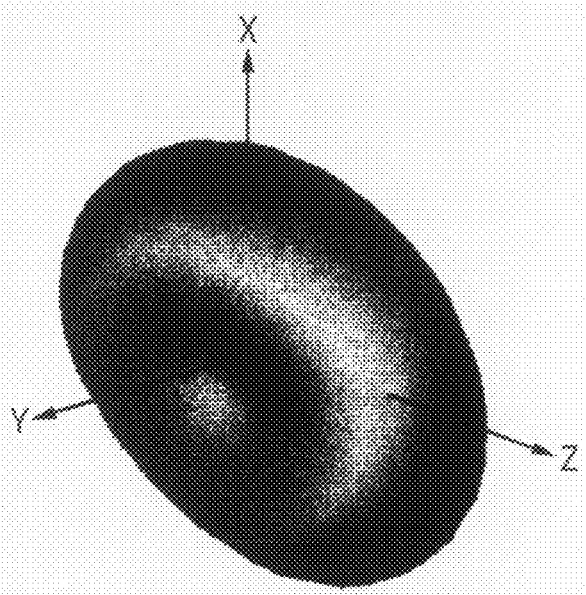
FIG. 9B is an exemplary diagram illustrating three-dimensional radiation patterns in the case of exciting the second antenna element in a half-opened state according to the first embodiment.
Figure 9C:
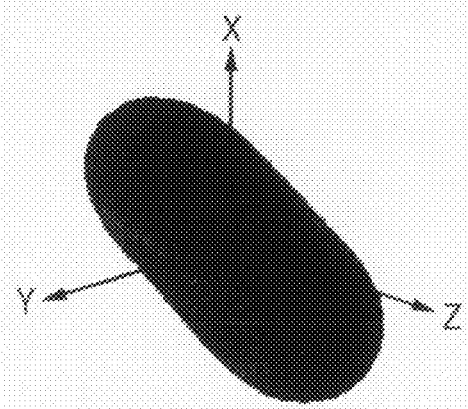
FIG. 9C is an exemplary diagram illustrating three-dimensional radiation patterns in the case of exciting the second antenna element in a closed state according to the first embodiment.

Since the first case 10 and the second case 20 are different in phase from each other in the opened state, the half-opened state, or the closed state, the radiation pattern formed in the case of exciting the second antenna element 23 is changed. Examples of the change will be described with reference to FIG. 9A to 9C. FIG. 9A, FIG. 9B, and FIG. 9C are diagrams illustrating three-dimensional radiation patterns in the case of exciting the second antenna element 23 in the opened state, the substantially half-opened state, or the closed state of the first case 10 and the second case 20, respectively, where the other conditions are the same conditions as FIG. 8.

In the radiation pattern in the opened state shown in FIG. 9A, a null point is formed in the Y-axis direction and a gain in the Z-axis direction decreases. This radiation pattern is formed as a result of the current distribution where the reversed-phase current is larger than the same-phase current, and the complementary relation with the radiation pattern in the case of exciting the first antenna element 13 is insufficient. The radiation pattern in the substantially half-opened state shown in FIG. 9B is similar to the radiation pattern shown in FIG. 8 (the distribution of the reversed-phase current and the same-phase current substantially balances). However, since a direction of a null point of the radiation pattern in the closed state shown in FIG. 9C deviates from the Y-axis, the complementary relation with the radiation pattern in the case of exciting the first antenna element 13 is insufficient. Consequently, the half-opened state in which the radiation pattern is shown in FIG. 8 is appropriate.

The higher symmetry of the reversed current in the negative and the positive directions of the Z-axis in FIG. 7, the higher the current offset degree. Accordingly, the complementary relation of the radiation pattern is further improved. In order to improve the complementary relation, it is preferable that the first board 11 and the second board 21 have substantially the same size. In addition, it is preferable that the second feeding point 22 is located substantially in the middle between the upper edge of the first board 11 and the lower edge of the second board 21, in a state where the substantially half area of the first board 11 and the substantially half area of the second board 21 overlap with each other in the half-opened state of the first case 10 and the second case 20.

As described above, the first case 10 and the second case 20 of the wireless device 1 are slid relative to each other, but are not limited thereto. For example, the first case 10 and the second case 20 may be ordinarily fixed in the half-opened state shown in FIG. 1B (the opening and the closing by the sliding are not performed).

According to the first embodiment, in the wireless device which can be opened and closed by sliding the two cases overlapping with each other, the beam diversity can be realized only by setting the opened and closed states.

Second Embodiment

Hereinafter, a second embodiment of the invention will be described with reference to FIG. 10. A wireless device and an antenna device according to the second embodiment are the same as the wireless device 1 and the antenna device 2 according to the first embodiment, respectively. The referred drawings in the first embodiment are referred in the second embodiment. In addition, in FIG. 3, 5, or 7, a distance between the upper edge and the lower edge of the first board 11 is 10 cm. The positional relation between the first board 11 and the second board 21 is the same as that shown in FIG. 2 or 3, and the second embodiment will be described below.

Figure 10A:
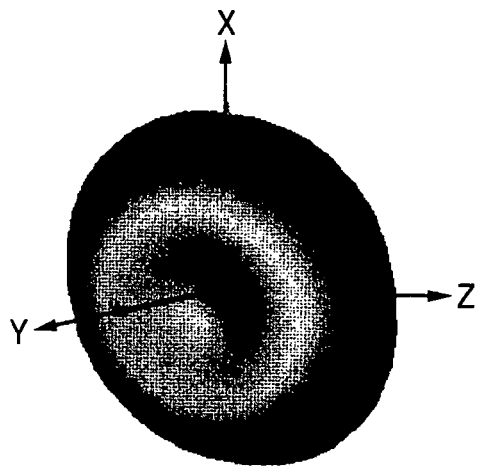
FIG. 10A-10D are exemplary diagrams illustrating three-dimensional radiation patterns in the case of exciting the second antenna element according to a second embodiment of the invention in four kinds of frequencies.
Figure 10B:
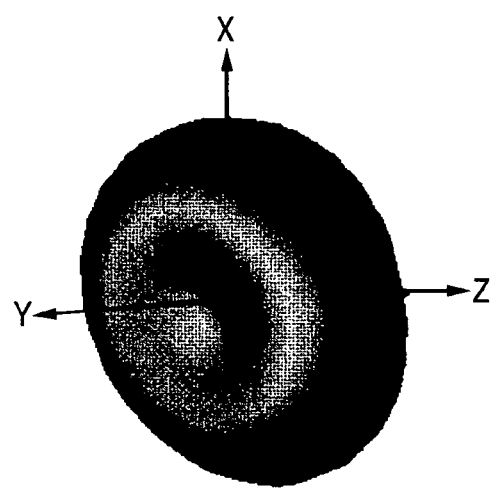
Figure 10C:
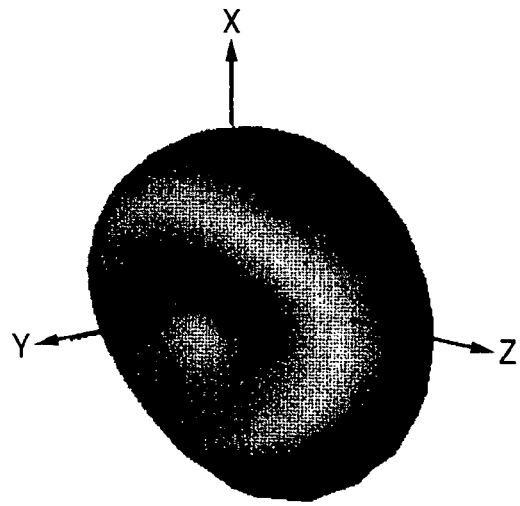
Figure 10D:
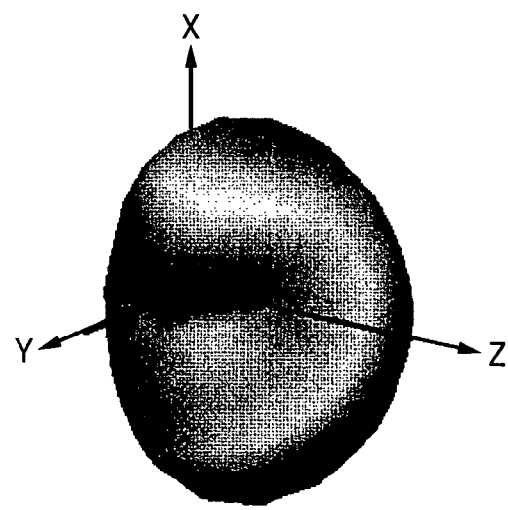

FIGS. 10A to 10D are exemplary diagrams illustrating three-dimensional radiation patterns in the case of exciting the second antenna element 23 under the same conditions as those in FIG. 8 except that a frequency is changed to four kinds. FIG. 10A shows a radiation pattern in a case where one-fourth wavelength in a frequency of 485 MHz is about 15 cm. FIG. 10B shows a radiation pattern in a case where one-fourth wavelength in a frequency of 570 MHz is about 13 cm. FIG. 10C shows a radiation pattern in a case where one-fourth wavelength in a frequency of 650 MHz is about 11 cm. FIG. 10D shows a radiation pattern in a case where one-fourth wavelength in a frequency of 725 MHz is about 10 cm.

In FIGS. 10A to 10C, similarly to FIG. 8, a donut-shaped radiation pattern having a null point in the Y-axis direction is formed, and a difference in phase according to frequency values is not shown (FIG. 10A has the lowest antenna gain or radiation efficiency, and FIG. 10C has the highest antenna gain or radiation efficiency). That is, since the distance (10 cm) between the upper edge and the lower edge of the first board 11 or the second board 21 is smaller than one-fourth wavelength, the current distribution in which symmetry of the reversed-phase current is high as shown in FIG. 7 is obtained.

In FIG. 10D, a null point in the Y-axis direction is slightly indefinite. In this case, the distance (10 cm) between the upper edge and the lower edge of the first board 11 or the second board 21 is equally one-fourth wavelength, and the second antenna element 23 can be configured only on any one (e.g., first board 11) of the first board 11 and the second board 21. For this reason, the current distribution of the other board (e.g., second board 21) is changed and thus the symmetry of the reversed-phase current is deteriorated. Consequently, the radiation pattern in which the null point is slightly indefinite is formed.

Similarly, a distance between the left edge and the right edge of the first board 11 or the second board 21 is preferably smaller than one-fourth usable wavelength of the wireless device 1. As the size of the first board 11 or the second board 21 becomes smaller, the radiation efficiency more decreases due to deviation from a resonance condition of the second antenna element 23. However, the second feeding point 22 may be loaded with a reactance element so as to compensate the deviation from such a resonance condition or a mismatch every frequency.

As described above, the antenna device 2 uses the current distributed on the ground pattern of the first board 11 or the second board 21 as a main radiation source and changes the current distribution to obtain the beam diversity effect. Accordingly, similarly to a chip antenna, the size of the first antenna element 13 or the second antenna element 23 may be smaller than one-fourth usable wavelength of the wireless device 1.

The first antenna element 13 or the second antenna element 23 may be a frequency tunable type. When any one of the first antenna element 13 and the second antenna element 23 is selected by the switch 4, a resonance frequency of the antenna element which is not selected is allowed to be different from a resonance frequency of the antenna element which is selected. In this manner, it is possible to restraint unnecessary resonance by the antenna element which is not selected (as for the frequency tunable antenna, see Minemura, Suzuki, Ohba, "Tunable Antenna Technique", Toshiba Review, Vol. 61, No. 7, July 2006, pp. 33 to 36).

According to the second embodiment, the size of the PCB can be reduced and the beam diversity effect can be improved.

Third Embodiment

Figure 11:
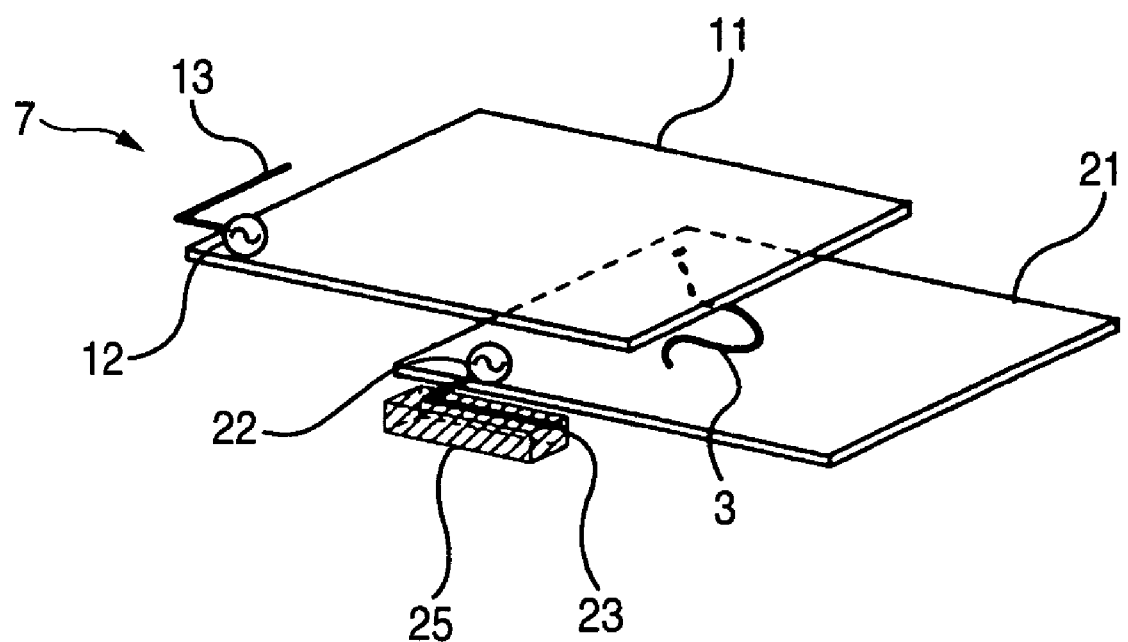
FIG. 11 is an exemplary diagram illustrating an antenna device according to a third embodiment of the invention.

Hereinafter, a third embodiment of the invention will be described with reference to FIGS. 11 to 17. FIG. 11 is a diagram illustrating an antenna device 7 according to the third embodiment. The antenna device 7 is a device in which the second antenna element 23 of the antenna device 3 shown in FIG. 3 is loaded with a dielectric 25. Since configurations of the antenna device 7 other than the dielectric 25 are all the same as the configurations of the of the antenna device 3 shown in FIG. 3, the same reference numerals are given to the configurations and the description thereof is omitted. The coordinate axes to describe radiation patterns are considered as the same as the axes of the first embodiment or the second embodiment, and the referred drawings in the first embodiment or the second embodiment are appropriately referred in the second embodiment. A positional relation between the first board 11 and the second board 21 is considered as the same as the positional relation shown in FIG. 2 or 3, and the third embodiment will be described below.

As described in the first embodiment, when the substantially half area of the first board 11 and the substantially half area of the second board 21 overlap with each other in the configuration of the antenna device 3 shown in FIG. 3, the ground patterns of both boards overlapping in two layers become close to the second antenna element 23 to result in electric coupling. Accordingly, the impedance of the second antenna element 23 excessively decreases.

The electric field facing from the second antenna element 23 toward the first board 11 and the second board 21 can be allowed to face in the reverse direction (toward the electric 25), by disposing the electric 25 in contact with the second antenna element 23 on the opposite side to the second board 21 with the second antenna element 23 interposed therebetween. In this manner, it is suppressed to couple the electric field between the second antenna element 23, and the first board 11 and the second board 21. Further, the impedance of the second antenna element 23 is prevented from excessively decreasing.

Since the wavelength can be shortened by loading the dielectric, it is possible to miniaturize the antenna element. That is, the first antenna 13 may be loaded with the dielectric for the miniaturizing.

An experimental antenna device similar to the antenna device 7 shown in FIG. 11 was prepared, and radiation patterns measured in a frequency of 600 MHz will be described with reference to FIGS. 12 to 17. For convenience, reference numerals shown in FIG. 7 are used hereinafter. In the first board 11 of the experimental antenna device, the upper edge and the lower edge have a length of 50 mm, and the left edge and the right edge have a length of 100 mm.

In the second board 21 of the experimental antenna device, the upper edge and the lower edge have a length of 50 mm, and the left edge and the right edge have a length of 100 mm. The first board 11 and the second board 21 is disposed at a distance of 4 mm. The connection line 3 is a flexible board having a length of 55 mm and a width of 10 mm.

The first antenna element 13 of the experimental antenna device is a folding-back monopole antenna, a linear conductor of which is bent so as to form a rectangle of 38 mm×8 mm at a distance of 7 mm from the upper edge of the first board 11 and a front end of which is connected to the ground pattern of the first board 11. The second antenna element 23 of the experimental antenna device is a folding-back monopole antenna, a linear conductor of which is bent so as to form a rectangle of 38 mm×8 mm at a distance of 7 mm from the left edge of the second board 21 and a front end of which is connected to the ground pattern of the second board 21.

The dielectric 25 loading the second antenna element 23 has a rectangular parallelepiped shape (size: 38 mm×8 mm×3 mm) having a thickness of 3 mm corresponding to a rectangular shape of the second antenna element, and a relative permittivity thereof is 12. The first antenna element 13 is loaded with a dielectric (not shown) close to the first board 11. The dielectric loading the first antenna element 13 has a rectangular parallelepiped shape (size: 38 mm×8 mm×2 mm) having a thickness of 2 mm corresponding to a rectangular shape of the first antenna element, and a relative permittivity thereof is 12.

Figure 12:
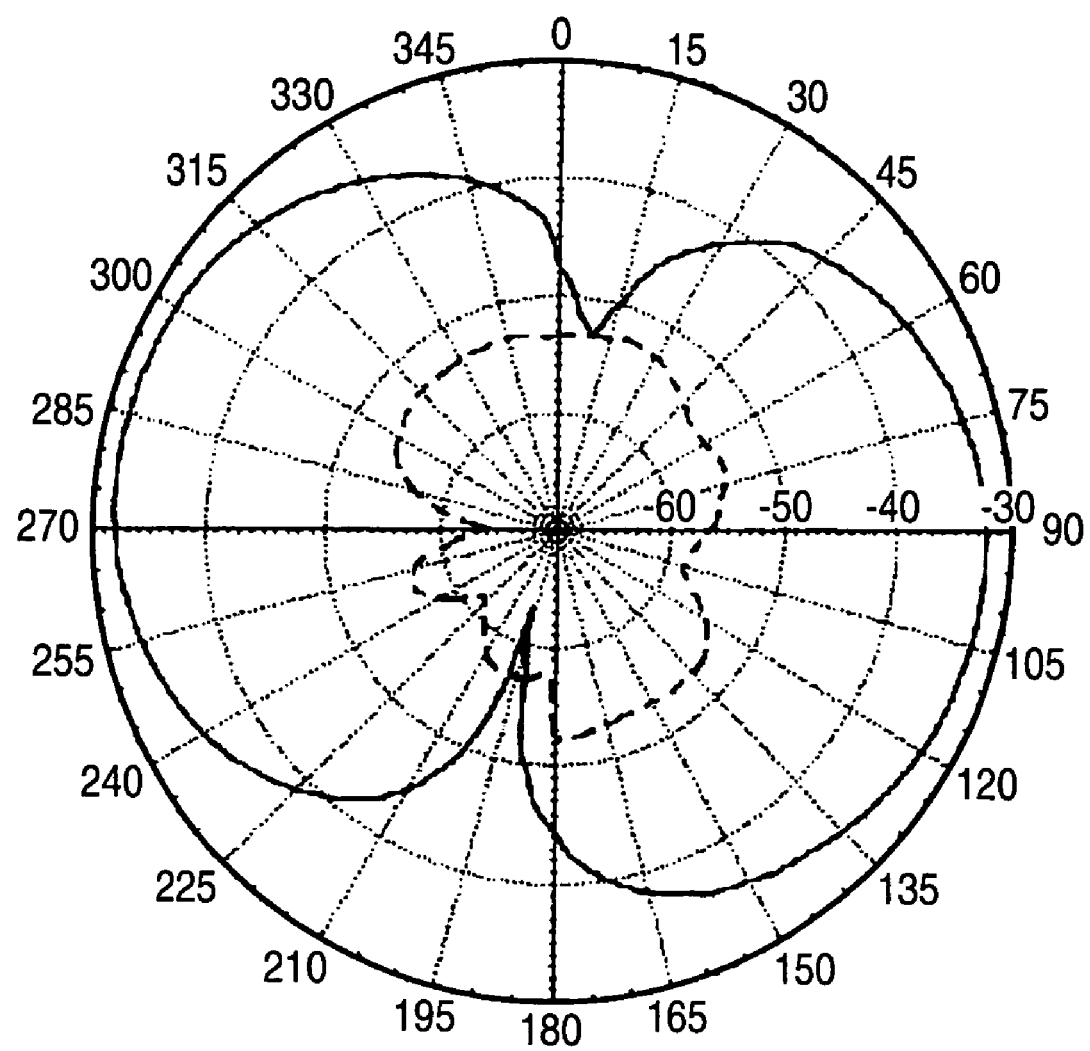
FIG. 12 is an exemplary diagram illustrating a radiation pattern measured in the third embodiment (only first antenna element is loaded, the half-opened state)

FIG. 12 is a diagram illustrating a radiation pattern obtained by exciting the first antenna element 13, under the conditions where the second antenna element 23 and the dielectric 25 are detached from the experimental antenna device the positional relation between the first board 11 and the second board 21 corresponds the half-opened state of the first case 10 and the second case 20 described in the first embodiment. A direction from 0 degree to 180 degree or the reverse direction corresponds to the Z-axis in FIG. 5 or 7. A direction from 90 degree to 270 degree of the reverse direction corresponds to the Y-axis in FIG. 5 or 7. Among curved lines representing radiation patterns, a solid line corresponds to a horizontal polarized wave and a broken line corresponds to a vertical polarized wave (the axes and the polarized waves in FIGS. 13 to 17 are classified in the same manner hereinafter).

Figure 13:
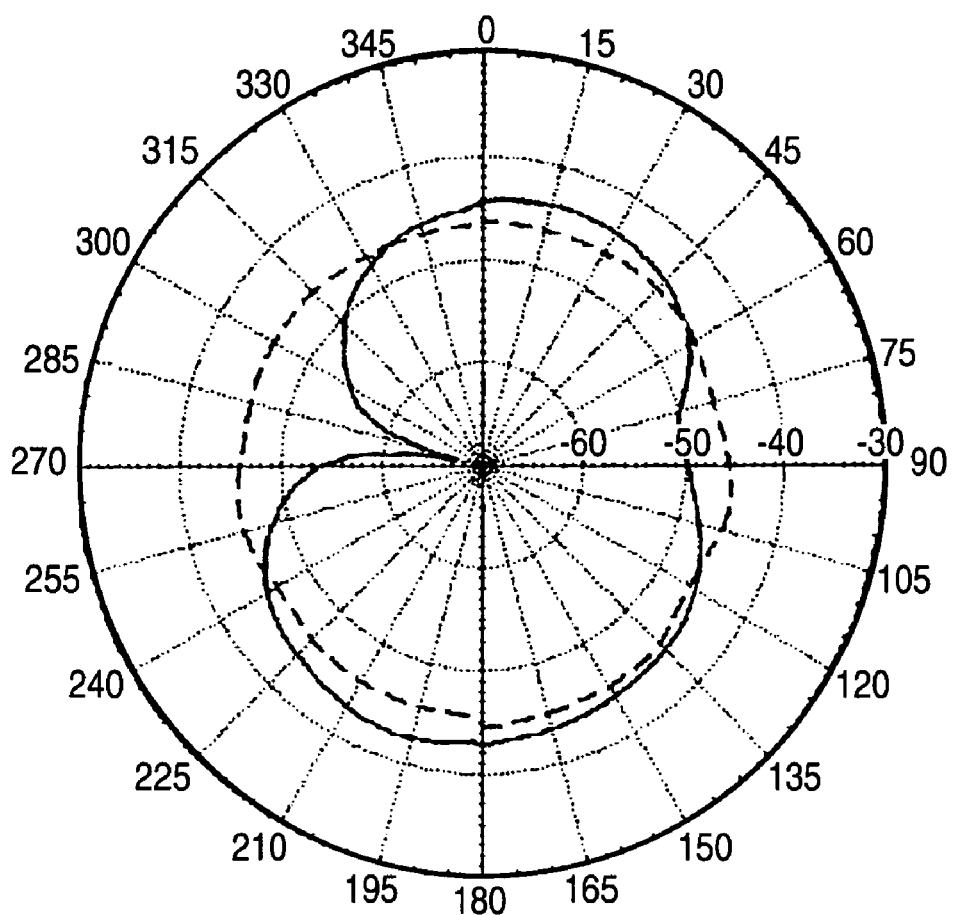
FIG. 13 is an exemplary diagram illustrating a radiation pattern measured in the third embodiment (only second antenna element is loaded, the half-opened state)

FIG. 13 is a diagram illustrating a radiation pattern obtained by exciting the second antenna element 23, under the conditions where the first antenna element 13 and the loaded dielectric (not shown) are detached from the experimental antenna device and the positional relation between the first board 11 and the second board 21 corresponds to the half-opened state described above. In the case corresponding to the half-opened state, a radiation pattern of the horizontal polarized wave in FIG. 12 has a null point substantially in the Z-axis direction. On the contrary, a radiation pattern of the horizontal polarized wave in FIG. 13 has a null point substantially in the Y-axis direction. That is, the directions of the null points are perpendicular to each other.

Figure 14:
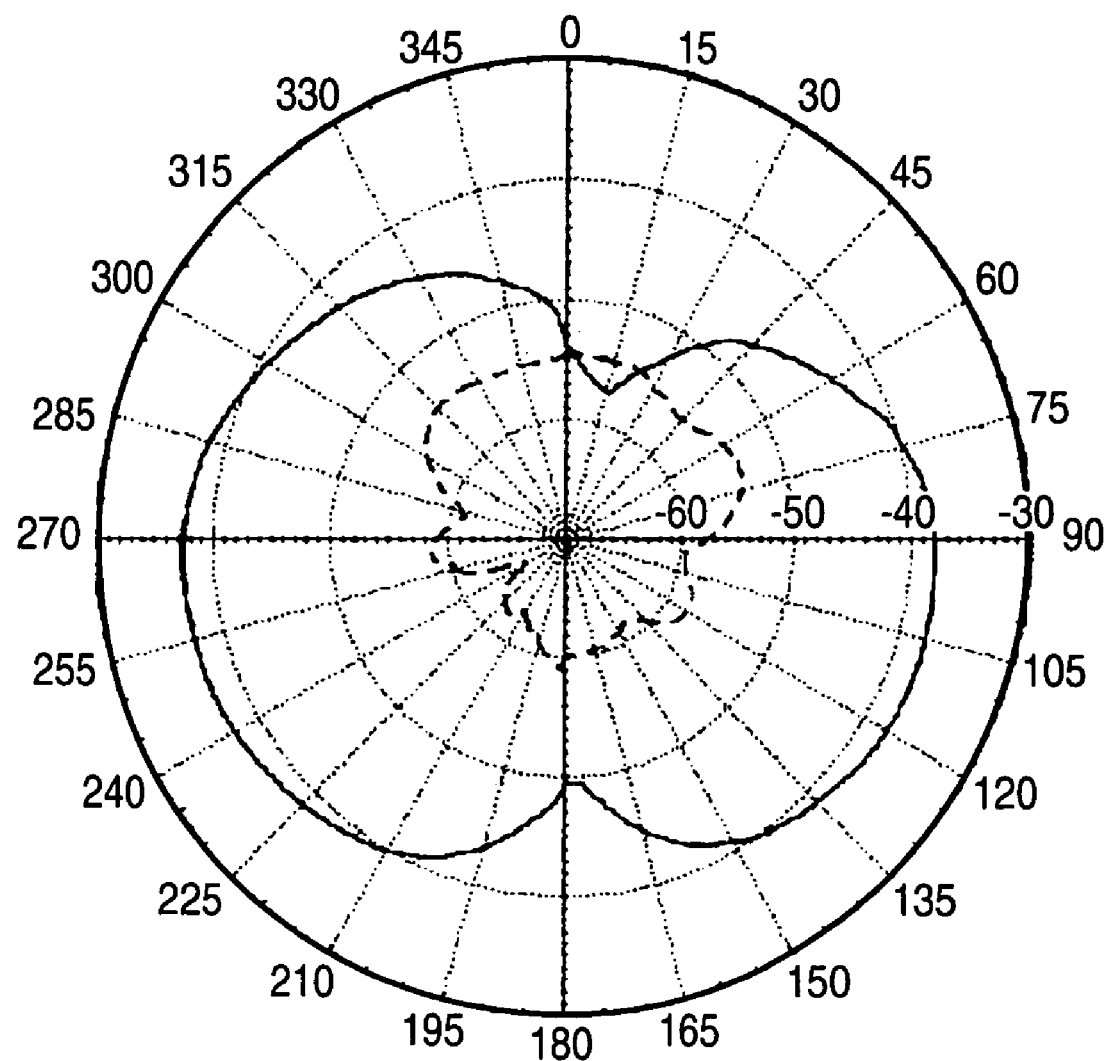
FIG. 14 is an exemplary diagram illustrating a radiation pattern measured in the third embodiment (only first antenna element is loaded, the closed state)
Figure 15:
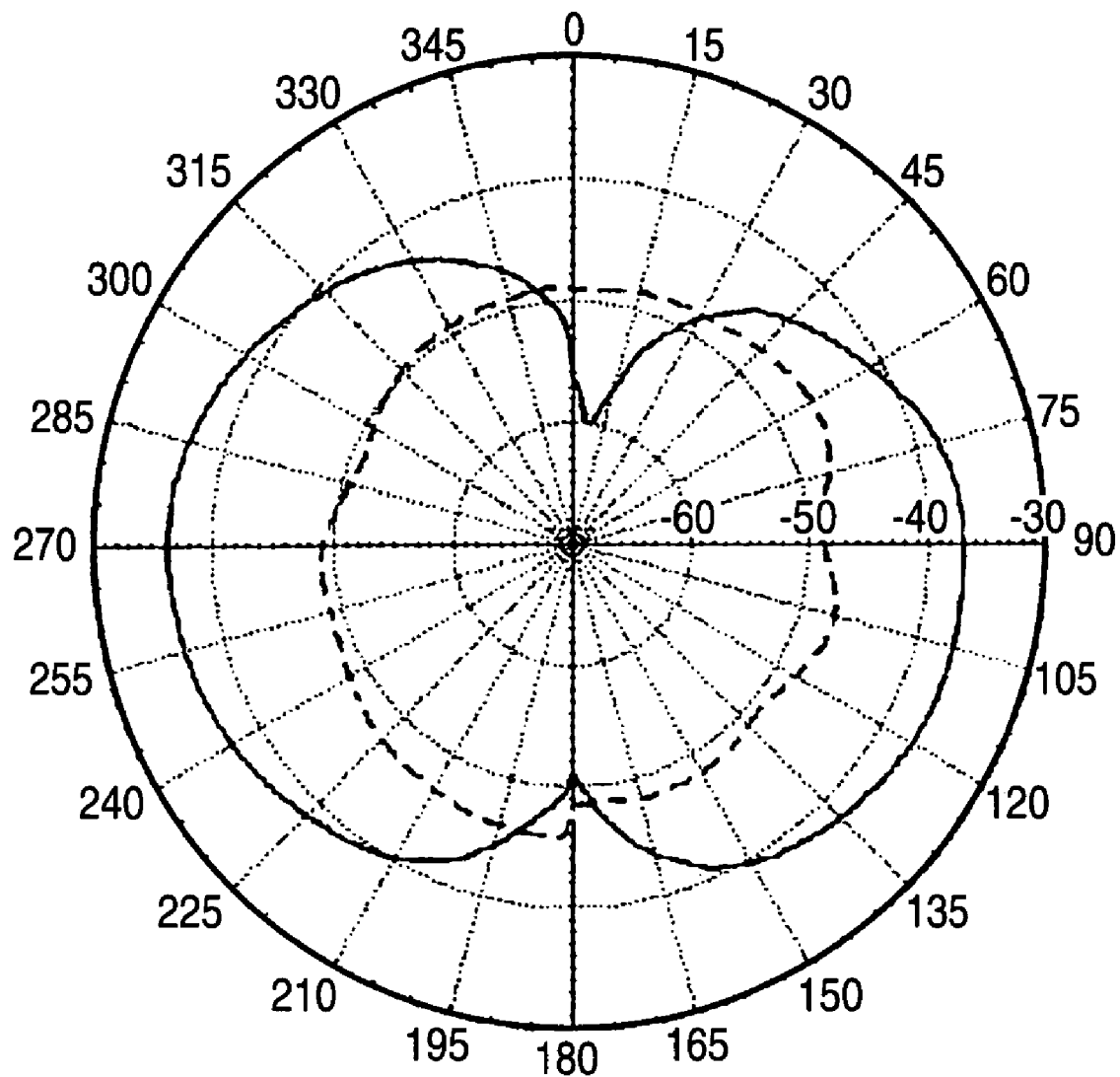
FIG. 15 is an exemplary diagram illustrating a radiation pattern measured in the third embodiment (only second antenna element is loaded, the closed state)

FIG. 14 is a diagram illustrating a radiation pattern obtained by exciting the first antenna element 13, under the conditions where the second antenna element 23 and the dielectric 25 are detached from the experimental antenna device and the positional relation between the first board 11 and the second board 21 corresponds to the closed state of the first case 10 and the second case 20 described in the first embodiment. FIG. 15 is a diagram illustrating a radiation pattern obtained by exciting the second antenna element 23, under the conditions where the first antenna element 13 and the loaded dielectric (not shown) are detached from the experimental antenna device and the positional relation corresponds to the closed state described above.

A radiation pattern of the horizontal polarized wave in FIG. 14 has a null point substantially in the Z-axis direction and a radiation pattern of the horizontal polarized wave in FIG. 15 also has a null point substantially in the Z-axis direction. That is, even when the first antenna element 13 and the second antenna element 23 are switched to each other in the case corresponding to the closed state, the perpendicular relation of the radiation patterns cannot be obtained.

Figure 16:
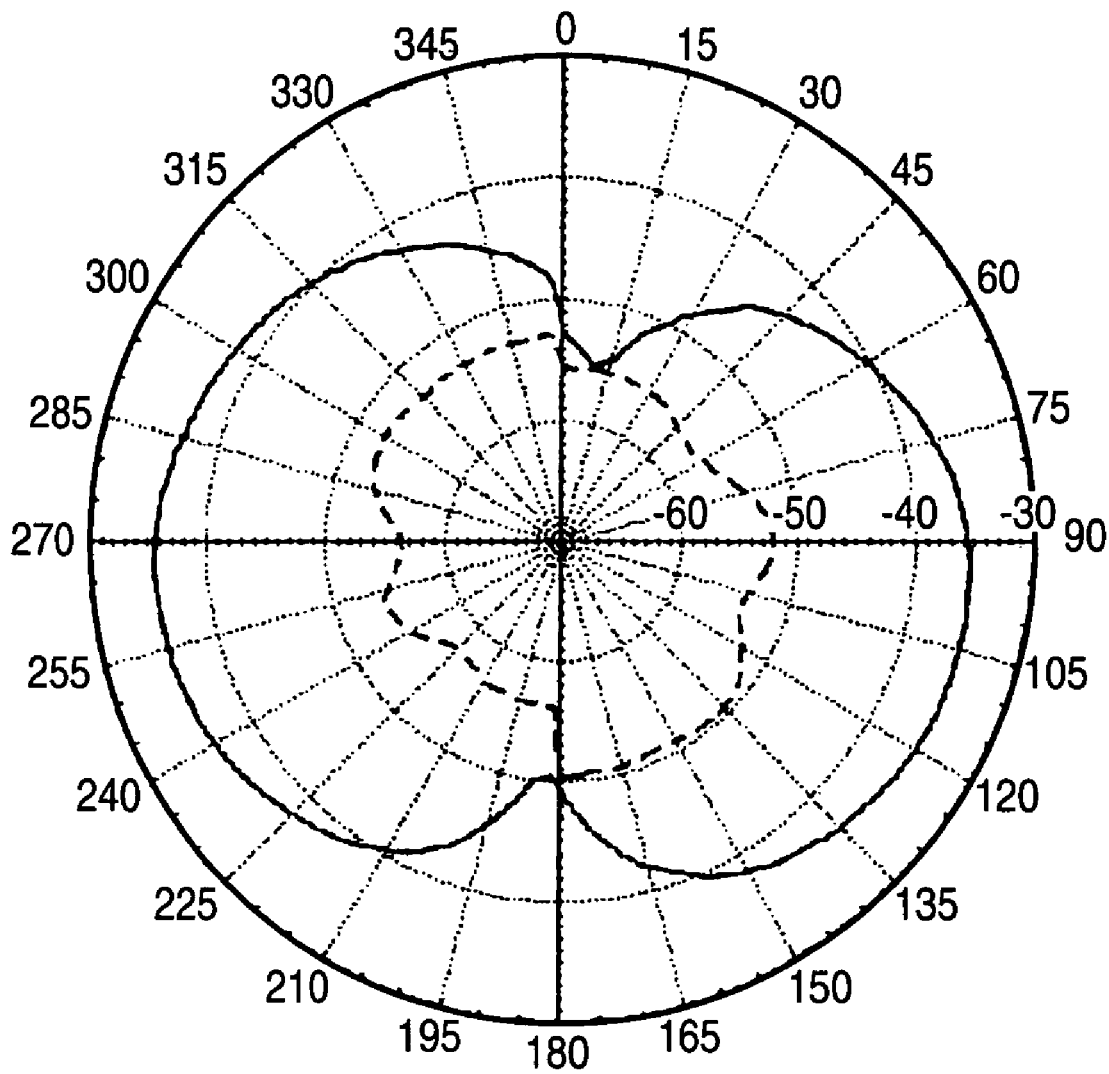
FIG. 16 is an exemplary diagram illustrating a radiation pattern measured in the third embodiment (the first antenna element and the second antenna element are loaded, the half-opened state, the first antenna element is excited)

FIG. 16 is a diagram illustrating a radiation pattern obtained by exciting the first antenna element 13 and terminating the second antenna element 23 at the second feeding point 22, under the condition where the positional relation between the first board 11 and the second board 21 corresponds to the half-opened state described above in the experimental antenna device. FIG. 15 is a diagram illustrating a radiation pattern obtained by exciting the second antenna element 23 and by terminating the first antenna element 13 at the first feeding point 12, under the conditions where the positional relation between the first board 11 and the second board 21 corresponds to the half-opened state described above in the experimental antenna device.

Figure 17:
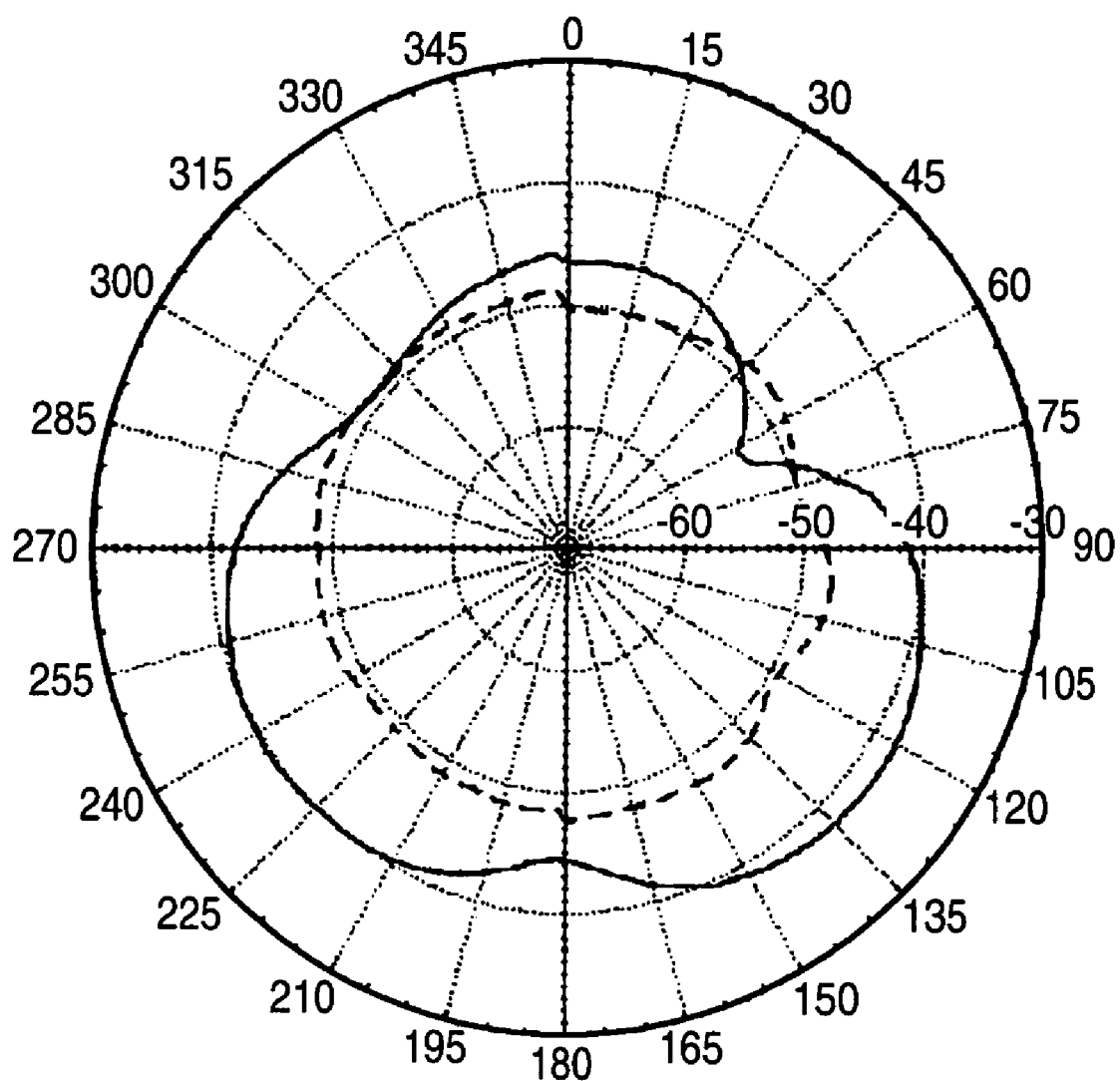
FIG. 17 is an exemplary diagram illustrating a radiation pattern measured in the third embodiment (the first antenna element and the second antenna element are loaded, the half-opened state, the first antenna element is excited).

In FIG. 16, a radiation pattern of the horizontal polarized wave has a null point substantially in the Z-axis direction similarly to FIG. 12. In FIG. 17, although a null point of a radiation pattern of the horizontal polarized wave in the Y-axis direction is not as definite as FIG. 13, a regular gain is formed in the Z-axis direction, thereby complementing the null point in FIG. 16. The experimental result described above supports the advantage of the invention described in the first embodiment to the third embodiment.

According to the third embodiment, the excessive decrease of the impedance of the antenna element due to the overlapping of the PCBs can be additionally prevented. The advantage of the embodiments is experimentally shown. The shape, the disposition, and the like of the wireless device 1 or the antenna device 2 described in the first embodiment to the third embodiment are examples and may be variously deformed or modified in the cope of the technical concept of the invention.

According to the above-described embodiments, since the antenna device is configured by making the most of characteristics of the small-sized wireless device such as the cellular phone, the antenna device is applicable to transmission and reception in a frequency band lower than a frequency band for communication without a complicated control.

What is claimed is:

1. An antenna device housed within a wireless device, comprising:
a first case and a second case at least partly overlapping with each other, the first and second cases electrically connected with each other and slidable to open and close the antenna device;
a first board housed within the first case;
a second board housed within the second case;
a first unbalanced antenna element connected to a first feeding point located in a vicinity of a first edge departing from the second case among edges of the first board when the first case and the second case are slid in a direction to open the wireless device; and
a second unbalanced antenna element being connected to a second feeding point located in a vicinity of a second edge substantially perpendicular to the first edge among edges of the second board.

2. The antenna device according to claim 1, wherein the first board and the second board have substantially the same size, and
wherein the second feeding point is located substantially in a middle between an edge of the second board far from the first case and the first edge, when a substantially half area of the second board overlaps with a substantially half area of the first board by sliding the first case and the second case relative to each other.

3. The antenna device according to claim 1, wherein at least one of sizes of the first board and the second board perpendicular to the first edge, a size of the first antenna element, and a size of the second antenna element is smaller than one-fourth wavelength of a frequency using for the wireless device.

4. An antenna device housed within a wireless device, comprising:
a first case and a second case being connected and at least partly overlapping with each other;
a first board that housed within the first case;
a first unbalanced antenna element being connected to a first feeding point located in a vicinity of a first edge far from the second case among edges of the first board;
a second board having substantially the same size as that of the first board, the second board housed within the second case and electrically connected to the first board, the second board being disposed so that a substantially half area thereof overlaps with a substantially half area of the first board; and
a second unbalanced antenna element being located in a vicinity of a second edge substantially perpendicular to the first edge among edges of the second board and connected to a second feeding point located substantially in a middle between an edge of the second board far from the first case and the first edge.

5. The antenna device according to claim 3, wherein at least one of sizes of the first board and the second board perpendicular to the first edge, a size of the first antenna element, and a size of the second antenna element is smaller than one-fourth wavelength of a frequency using for the wireless device.

6. A wireless device comprising:

a first case;

a second case at least partly overlapping with the first case so as to open and close the wireless device by sliding the first case and the second case;

a first board that housed within the first case;

a first unbalanced antenna element being connected to a first feeding point located in a vicinity of a first edge departing from the second case among edges of the first board when the first case and the second case are slid in a direction to open the wireless device;

a second board housed within the second case and electrically connected to the first board;

a second unbalanced antenna element connected to a second feeding point located in a vicinity of a second edge substantially perpendicular to the first edge among edges of the second board; and a diversity circuit being connected to the first unbalanced antenna element and the unbalanced second antenna element.

* * * * *